US006394439B1

(12) United States Patent
Weber

(10) Patent No.: US 6,394,439 B1
(45) Date of Patent: *May 28, 2002

(54) TWO-SIDED GRIPPING DEVICE

(75) Inventor: Gene Christopher Weber, Fresno, CA (US)

(73) Assignee: Dan Wilkins, Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/411,950

(22) Filed: Oct. 4, 1999

(51) Int. Cl.[7] .................................................. B23Q 3/02
(52) U.S. Cl. ................... 269/138; 269/234; 269/254 R; 269/43
(58) Field of Search ................................. 269/134, 137, 269/138, 141, 165, 166, 203, 204, 99, 101, 229, 234, 235, 254 R, 257, 254 CS, 268, 43; 911/191, 192, 354, 393, 531, 537, 539

(56) References Cited

U.S. PATENT DOCUMENTS 4,804,171 A * 2/1989 Dornfeld .................... 269/138
5,961,108 A * 10/1999 Weber ........................ 269/234

* cited by examiner

*Primary Examiner*—Robert C. Watson
(74) *Attorney, Agent, or Firm*—Merek & Voorhees

(57) ABSTRACT

A device having a fixture with a working surface and at least one hole, at least one stop rising above the working surface, a fastener, a gripping member having a first block portion and a second block portion where the first block portion is joined to the second block portion for relative movement. Each block portion has an inner wall and a gripper wall adapted to engage a workpiece, the inner walls of the first and second block portions form a through bore for receiving the fastener when the first and second block portions are joined and each inner wall has a lower radial surface and an upper conical surface. A portion of the upper conical surface is less recessed than the other portions of the upper conical surface whereby at least one of the first and second block portions of the gripping member slides toward the at least one stop and the gripper wall of the respective block portion applies a downward inward holding force on a workpiece when the fastener bears against the less recessed portion of the respective at least one block thereby creating the downward inward holding force and securing the fastener to the at least one hole of the fixture.

4 Claims, 2 Drawing Sheets

FIG. 4
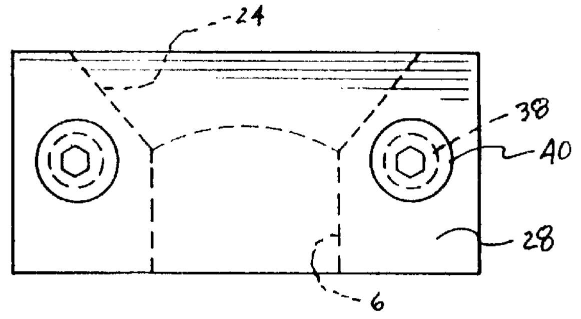
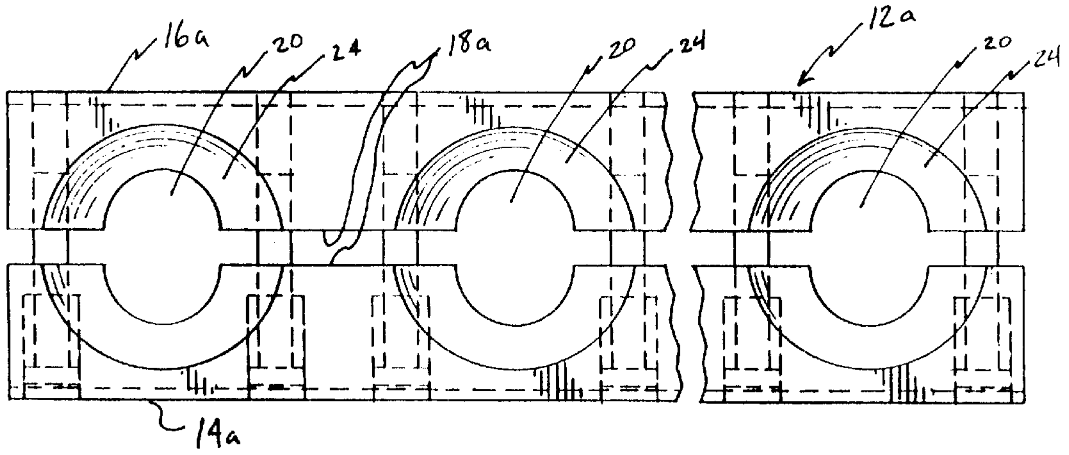
FIG. 5

TWO-SIDED GRIPPING DEVICE

CROSS-REFERENCE TO RELATED APPLICATION

This application claims priority under 35 U.S.C. § 120 of U.S. patent application Ser. No. 08/840,935 filed on Apr. 25, 1997 and which issued as U.S. Pat. No. 5,961,108 on Oct. 5, 1999 which in turn claims priority under 35 USC 120 from U.S. Patent Application Ser. No. 08/ 555,869 filed on Nov. 13, 1995 and which issued as U.S. Pat. No. 5,624,106 on Apr. 29, 1997.

FIELD OF THE INVENTION

The invention relates, in general, to machine tools, and in particular, to devices for holding at least one workpiece on the supporting surface of cutting machines, especially for use in repetitive production and/or preprogrammed machining.

BACKGROUND OF THE INVENTION

Many mechanical operations require that one or more workpieces be held stationary for a period of time. Various types of clamps and other devices are known in the art for securing a workpiece in a desired position to facilitate an operation on the workpiece.

An apparatus for securing one workpiece at a time is disclosed in U.S. Pat. No. 4,805,888 to Bishop. The Bishop patent describes a two-piece adjustable clamp where the bolt-like portion of each clamp has a lower end threaded into a cooperating tapped hole of a platen, and has an eccentrically-offset upper end about which a shallow nut-like portion is socketed for orbital camming movements. However, Bishop has vertical walls where only one of the vertical walls can hold a workpiece laterally when the bolt-like portion is fastened to the platen.

Another apparatus for securely holding a workpiece is described in U.S. Pat. No. 5,310,299 to Bernstein. The Bernstein patent describes a clamping member having a concentric conical bore (i.e., a bore that is not offset) for receiving a fastener therethrough which when turned engages against the inner bearing surface of the conical bore providing a single lateral force which urges the clamping member toward a workpiece and a stop. Thus, the clamping device of Bernstein's has only a single vertical surface which can hold a workpiece securely against a stop.

Accordingly, both clamping devices described by Bishop and Bernstein solely produce a single lateral or horizontal force for securing a workpiece against a stop on a platen which is inadequate for securing a workpiece during machining and only one side of both their devices can hold a workpiece. Consequently, these clamps and other known clamping devices have failed to secure workpieces when a cutting machine is removed from the workpiece. That is, when a cutting machine such as a drill or slitting saw is inserted into the workpiece there is usually no problem as the horizontal or lateral force holds the workpiece; but, when the drill or slitting saw is removed, the workpiece pops or jumps out of the clamp.

Furthermore, in addition to the downtime caused by the workpiece or several workpieces jumping out of the clamp, the jolt which causes the workpieces to pop out also causes damage to the clamp. Thus, considerable time and money are lost in replacing the workpieces and the clamps due to this prior design.

The above problem was solved with the gripping device which is disclosed in U.S. patent application Ser. No. 08/555,869, filed Nov. 13, 1995. That application is incorporated herein by reference.

U.S. Pat. No. 3,473,420 to Boggs shows an apparatus for positioning and clamping one or more workpieces. However, three points of contact are required to hold each workpiece and thus, at least two positioning blocks are need to secure a single workpiece. As a result, a large portion of the platen or jig is devoted to positioning blocks or stops and not to the workpieces. Consequently, a longer time is required to secure each block, and, additional expense is incurred in the use of the larger or more platens that are needed to secure the workpieces.

Applicant is aware of a two-piece clamping device which is produced under the name KIRK VISE. However, that clamp employs rubber parts and lacks an offset bore and thus the clamp is limited in what it can hold down and further has too much travel. Morever, this clamping device breaks down after limited amount of use causing downtime and additional expense in replacing the worn clamping devices.

SUMMARY OF THE INVENTION

The present invention overcomes the above problems by providing a device having a fixture with a working surface and at least one hole, at least one stop rising above the working surface, a fastener, a gripping member having a first block portion and a second block portion where the first block portion is joined to the second block portion for relative movement, each block portion has an inner wall and a gripper wall adapted to engage a workpiece, the inner walls of the first and second block portions form a through bore for receiving the fastener when the first and second block portions are joined and each inner wall has a lower radial surface and an upper conical surface, a portion of the upper conical surface is less recessed than the other portions of the upper conical surface whereby at least one of the first and second block portions of the gripping member slides toward the at least one stop and the gripper wall of the respective block portion applies a downward inward holding force on a workpiece when the fastener bears against the less recessed portion of the respective at least one block thereby creating the downward inward holding force and securing the fastener to the at least one hole of the fixture.

Accordingly, it is an object of the present device for holding at least one workpiece while a workpiece is being worked on by a machine.

Another object of the invention is to provide two parallel, spaced-apart stops and the at least one hole of the fixture is positioned between the parallel stops so that both gripper walls of the first and second block portions can secure workpieces to the fixture.

The holding force or forces of the invention may be achieved by a gripper wall having an upper and lower section where the upper section applies the holding force.

It is a further object of the invention to have a gripper wall which is potentially tapered from the upper section to the lower section.

It is yet another object of the invention to provide biasing means for joining and biasing together the first and second block portions against relative movement. The biasing means tends to evenly distribute the holding forces on the workpieces when two workpieces are held on either side of the gripper and also facilitates release of the gripper walls away from the workpieces when the gripper fastener is raised.

It is still a further object of the present invention to provide a gripping member for holding at least one workpiece on a fixture which includes a first block portion having an inner wall and a gripper wall, and a second block portion having an inner wall and a gripper wall where the first and second block portions are joined for relative movement and the inner walls of the first and second block portions form a countersink and a through bore when said first and second block portions are joined. The offset-countersink has first and second conical surfaces where the first conical surfaces are less recessed than the second whereby at least one gripper wall applies a downward inward holding force on a respective workpiece when a fastener secures gripping member to a fixture.

According to the present invention, a gripping member is provided for holding at least one workpiece on a fixture which includes first and second block portions, each block portion having an inner wall for forming a through bore for receiving a fastener when the first and second block portions are joined and a gripper wall adapted to engage a workpiece. Each gripper wall may be tapered inwardly from an upper edge to a lower edge depending on the workpiece to be engaged so that the gripper wall applies the appropriate downward inward force on a workpiece when a fastener secures the gripping member to a fixture.

The invention will become more fully apparent from the claims and the description as we proceed in connection with the drawings.

DETAILED DESCRIPTION OF THE DRAWINGS

FIG. 4 is a side view of the gripping member shown in FIG. 3; and

FIG. 5 is a top view of another embodiment of the gripping member according to the invention.

DETAILED DESCRIPTION OF THE INVENTION

Figure 1:
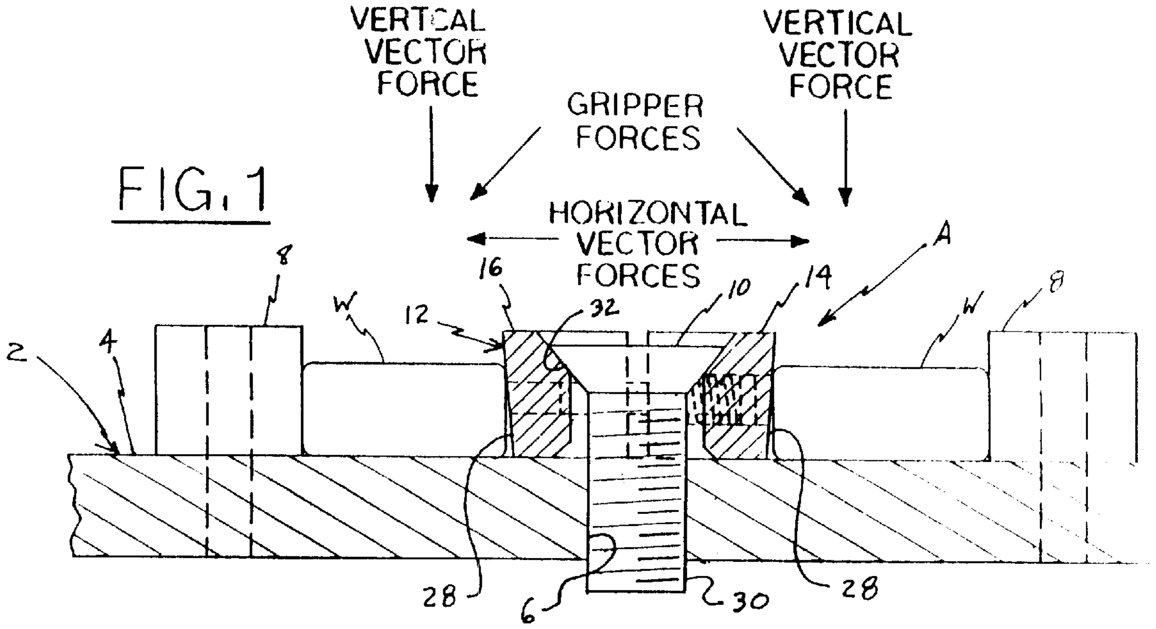
FIG. 1 is a side view, partially in cross-section, of a gripping device for holding at least one workpiece according to an embodiment of the present invention.

Referring to FIG. 1, there is shown a gripping device A for holding at least one workpiece W in position according to an embodiment of the invention.

Gripping device A includes a fixture 2 having a working surface 4 and at least one hole 6; at least one stop 8 rising above the surface of working surface 4 of fixture 2; a fastener 10 and a gripping member 12. As shown in FIG. 1, two parallel, spaced-apart stops 8 are provided, one on either side of hole 6. Stops 8 are fastened to fixture 2 via conventional methods or are integral with fixture 2.

Figure 2:
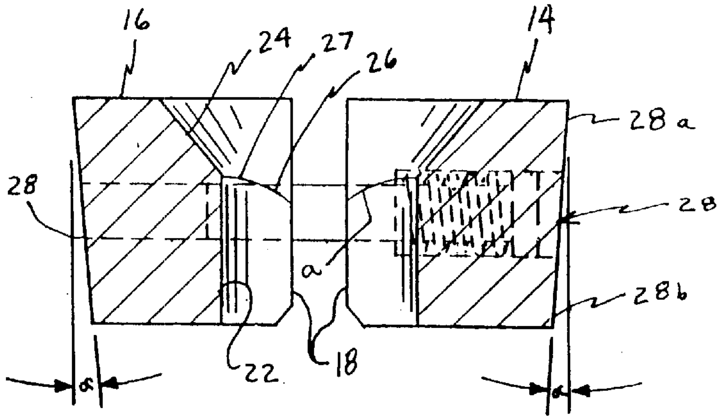
FIG. 2 is a cross-section view of a gripping member according to the invention shown to be engaged with round workpieces.

Gripping member 12 has a first block portion 14 and a second block portion 16 where first block portion 14 is joined to second block portion 16 for relative movement. As clearly shown in FIGS. 2–3, each block portion 14,16 has an inner wall 18 which when joined together form a through bore 20 for receiving fastener 10. Each inner wall 18 has a lower radial surface 22 and an upper conical surface or countersink 24. Lower radial surface 22 meets with countersink 24 in varying positions along arc a as shown in FIG. 2. Thus, a portion 26 of each upper conical surface or countersink 24 is less recessed that the other portions 27 of the countersink. Each block portion 14,16 also has a gripper wall 28 adapted to engage a workpiece.

Fastener 10 may be a standard flat-head bolt formed with a threaded shaft 30 and a tapered head 32. When fastener 10 is secured to hole 6 of fixture 2, either by being received in a threaded hole 6 or a threaded nut (not shown) on the reverse side of fixture 2, each block portion 14,16 of gripping member 12 slides away from the center of through bore 20 toward stop 8 and each gripper wall 28 applies a downward inward holding force on the respective workpiece W. Of course, if only one stop 8 is provided on a fixture, then only one gripper wall of block portions 14,16 would apply such a holding force to secure a workpiece to a fixture 2. The holding force begins when fastener 10 presses against less recessed portion 26 and workpiece W abuts gripper wall 28 and arcs downward through workpiece W to working surface 4 of fixture 2 thereby pushing workpiece W in towards stop 8 and down against working surface 4.

The downward inward holding force can be created by a draft angle $\alpha$ formed on either or both gripper walls 28 as clearly shown in FIG. 2. In this embodiment, gripper wall 28 is tapered from an upper section 28*a* to a lower section 28*b* forming a draft angle $\alpha$ which is inward from a vertical line. Draft angle $\alpha$ is greater than 0° to approximately 3°, preferably 1.5° pending the workpiece being held. As shown in FIG. 2, the tapered gripper wall 28*a,b* pushes against cylindrical workpieces W' with the force created when fastener 10 bears against less recessed portion 26 of countersink 24 and can lock workpieces W' in place. The draft angle $\alpha$ can be 0° for square workpieces. Tapered gripper walls 28*a,b* of the invention are capable of locking a round during machining operations.

Instead of a draft angle, upper portion 28*a* may apply the holding force on a workpiece. In such an embodiment, gripper wall 28 may be configured in a manner (e.g., recess) such that lower portion 28*b* would be a distance from the secured workpiece in the holding position. Further, the bottom wall of gripper member 12 may be tapered upwardly in the direction of the workpiece to achieve similar resulting forces.

One method of creating the lower radial surface 22 and upper conical surface or countersink 24 of each inner wall 18 will be discussed below. Two ½×½ rectangular blocks are pinned together in a vise and then a clearance hole is drilled at the center of the two blocks. Then, the two rectangular blocks are taken apart and a spacer is placed there between. The spacer is approximately one-eight of an inch in width and made of aluminum in the preferred method. The two rectangular blocks and spacer are pinned together in a vise and then a counterbore is drilled, preferably a standard 82° countersink. Once the spacer is removed, each rectangular block is formed with an inner wall having a lower radial surface 22 and an upper conical surface 24 as discussed above.

Figure 3:
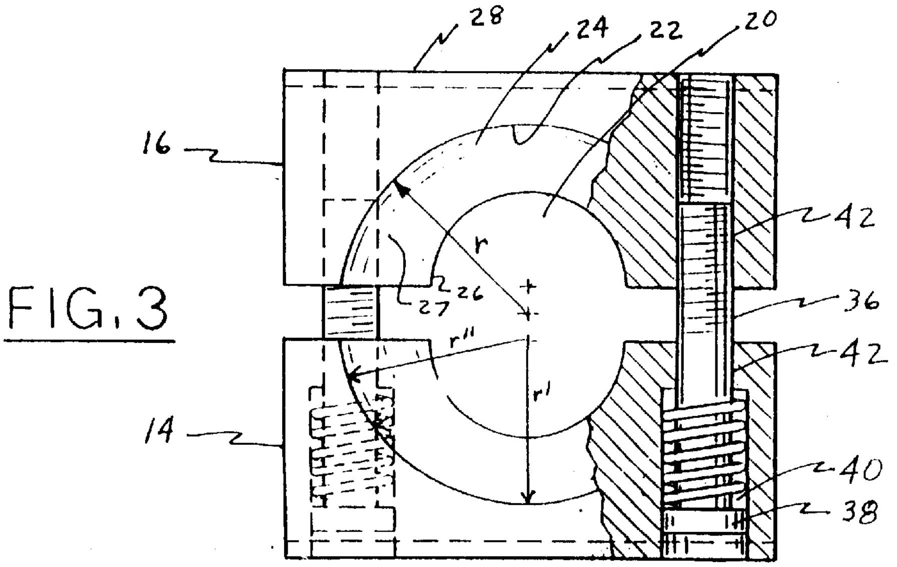
FIG. 3 is a top view of the gripping member shown in FIG. 2.

Looking at FIG. 3, three radii of different lengths are shown which are formed from the above described procedure. Radius r is the longest and it extends from the center of through bore 20 to the top of upper conical surface 24. Radii r',r" extend from the edge of the spacer (not shown) to a point on arc a (shown in FIG. 2). Radius r' is a little longer than radius r". Thus, the spacer creates the offset necessary to produce less recessed portion 26 of upper conical surface 24. In a preferred embodiment, this offset could be as small as 0.0625 of an inch. This offset causes each block portion to self align and develops the press when fastener 10 is applied.

Accordingly, when fastener 10 is received through gripping member 12 its tapered head 32 bears against each less recessed portion 26 of each upper conical surface or countersink 24 forming a resultant gripper force when fastener 10 is secured to fixture 2. That is, as shown in FIG. 1, tapered head 32 bears against the less recessed portion 26 of both upper conical surfaces 24 thereby providing two resultant gripper forces formed of respective horizontal vector forces and vertical vector forces. Each horizontal gripping force causes each block portion 14,16 of gripping member 12 to slide across working surface 4 of fixture 2 away from the center of through bore 20 to hold each workpiece W against each respective stop 8. While the vertical vector force is formed from tapered head 32 pressing against the less recessed portion 26 of each block portion 14,16 and securely holds each block portion 14,16 against fixture 2.

Thus, fastener 10 pushes each workpiece W in toward stop 8 and downward toward fixture 2 with the unique resultant gripper force created by each gripper wall 28 and the bearing surface of upper conical surface or countersink 24. Tapered ripper wall 28 pushes workpiece W down and against stop 8 locking it in place during a machining operation such that when a machine is removed from the workpiece , even though the workpiece may pop, it catches an edge of upper section 28*a* of a respective block portion 14,16. Accordingly, workpiece W remains in its secured position during all machining operations.

Countersink 24 is designed with an offset such that when fastener 10 is released from its hole by a half turn of an Allen wrench or the like, tapered head 32 no longer bears against the less recessed portion 26 of each block portion 14,16 and in fact, still rests within countersink 24.

Looking again at FIG. 3, gripping member 12 of the preferred invention may include first and second biasing means 34, preferably springs, located on either side of the less recessed portion 26 of one of block portions (14 in FIG. 3). In a preferred embodiment to join first block portion 14 with second block portion 16, second block portion 16 has two spaced-apart pins 36 on either side of the less recessed portion 26 of block portion 16. Each pin 36 has an enlarged pin head 38 which may be flat and is attached to block portion 16 via conventional methods (e.g., press fit or screw threads). Block portion 14 has an enlarged chamber 40 on either side of less recessed portion 26 of block portion. Enlarged chamber 40 is wide enough to receive a respective pin head 38 and narrows to a thinner chamber 42 toward inner wall 18 of block portion 14. Biasing means 34 are placed around each respective pin 36. Pins 36 and biasing means 34 are inserted through each enlarged chamber 40 of first block portion 14 and extend through thinner chambers 42 where the exposed ends of pins 36 are attached to second block portion 16 thereby joining first and second block portions 14,16. The length of enlarged chambers 40 determines the tightness of biasing means or springs 34. When the first and second block portions 14,16 are joined the biasing means or springs 34 are preferably in a relaxed mode or a little bit compressed.

FIG. 4 shows an end view of gripper wall 28 of first block portion 14. The enlarged chambers 40 contain pin heads 38 and are expanded almost to the end of gripper wall 28.

As shown in FIG. 5, a gripper member 12*a* having a plurality of through bores 20 and countersinks 24 formed by the inner walls 18*a* of first and second block portions 14*a*, 16*a* can be used for larger workpieces and/or of different lengths. For example, a 3-inch two sided gripper may have two through bores 20 and countersinks 24, while a 6-inch two sided gripper may have three through bores 20 and countersinks 24.

Fixture 2 can be constructed of either steel, brass or aluminum, preferably steel. If fixture 2 is manufactured from aluminum and if a threaded hole 6 is desired such a hole should be reinforced with wither a steel or brass threaded core. Fixture 2 is designed for attachment to a machine which enables workpieces held on fixture 2 to be cut (either drilled or sawed etc.).

Gripping member 12 may be manufactured out of aluminum, brass or steel depending upon the material desired. A locking capability of gripping member 12 according to the invention is plus or minus 20 thousandths of an inch. However with the biasing means and the two block portion device, one side of gripping member 12 can hold a workpiece with a tolerance of plus or minus 5 thousandths of an inch on one side and 140 thousandths of an inch on the other side. Thus, the tolerance of the two sided gripping member is flexible and much less than those tolerances required by known prior art devices.

Accordingly, a gripper member 12 can be manufactured to secure small parts as small as microchips or as large as cylindrical parts for vehicles. Plus, the two-sided gripping member 12 allows different part types to be placed on the same fixture for machining. While the term block has been used to describe this preferred embodiment, this invention is not limited to any particular shape.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

What is claimed is:

1. A gripping member for holding at least one work piece on a fixture comprising:

a) a first block portion having an inner wall and a gripper wall, said gripper wall applies the holding force to the work piece, said first block portion further having first and second bores each of which extends from said gripper wall to said inner wall, said first bore being spaced from said second bore;

b) a second block portion having an inner wall and a gripper wall, said gripper wall applies the holding force on the work piece, said second block portion further having first and second bores, said first bore being spaced from said second bore;

c) said inner walls of said first and second block portions forming a through bore and a countersink when said first and second block portions are joined;

d) first and second springs, said first spring being disposed entirely within the said first bore of said first block portion, said second spring being entirely disposed within said second bore of said first block portion;

e) a first pin extending from said first bore of said first block portion to said first bore of said second block portion; and, f) a second pin extending from said second bore of said first block portion to said second bore of said second block portion.

2. A gripping member as set forth in claim 1, wherein:

a) said first and second pins each having a head portion and a shank portion, said shank portion having a diameter less than said head portion, said head portion of each of said first and second pins being disposed adjacent said gripper wall of said first block portion.

3. A gripping member as set forth in claim 2, wherein:

a) an end of said first spring abuts said head portion of said first pin and an end of said second spring abuts said head portion of said second pin.

4. A gripping member as set forth in claim 3, wherein:

a) said first and second springs bias said first block portion and said second block portion together.

* * * * *